US012475781B2

(12) United States Patent
Austin et al.

(10) Patent No.: US 12,475,781 B2
(45) Date of Patent: Nov. 18, 2025

(54) SYSTEMS AND METHODS FOR DETECTING IMPAIRED DECISION-MAKING PEDESTRIANS

(71) Applicant: Toyota Motor Engineering & Manufacturing North America, Inc., Plano, TX (US)

(72) Inventors: Benjamin Piya Austin, Saline, MI (US); Rohit Gupta, Santa Clara, CA (US); Philip J Babian, Canton, MI (US); Ali C Eren, Flower Mound, TX (US); William Patrick Garrett, Plymouth, MI (US); Rebecca L Kirschweng, Bloomfield Hills, MI (US); Dianne O Tykoski, Canton, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 141 days.

(21) Appl. No.: 18/533,750

(22) Filed: Dec. 8, 2023

(65) Prior Publication Data
US 2025/0191461 A1    Jun. 12, 2025

(51) Int. Cl.
*G08G 1/005* (2006.01)
*G08G 1/01* (2006.01)

(52) U.S. Cl.
CPC .......... *G08G 1/005* (2013.01); *G08G 1/0112* (2013.01); *G08G 1/0116* (2013.01)

(58) Field of Classification Search
None
See application file for complete search history.

(56) References Cited

U.S. PATENT DOCUMENTS

| | | | |
|---|---|---|---|
| 7,958,201 B2 | 6/2011 | Lindsay | |
| 9,687,187 B2 | 6/2017 | Dagum | |
| 9,734,390 B2 | 8/2017 | Maurer et al. | |
| 9,904,846 B2 | 2/2018 | Kindo et al. | |
| 10,028,971 B2 | 7/2018 | Bird | |

(Continued)

FOREIGN PATENT DOCUMENTS

| | | |
|---|---|---|
| JP | 2022021168 A | 2/2022 |
| WO | 2023087917 A1 | 5/2023 |

OTHER PUBLICATIONS

Liu et al. "Mining Indecisiveness in Customer Behaviors", 2015 IEEE International Conference on Data Mining. 2015.

*Primary Examiner* — John F Mortell
(74) *Attorney, Agent, or Firm* — Christopher G. Darrow; Darrow Mustafa PC

(57) ABSTRACT

Systems, methods, and other embodiments described herein relate to identifying and assisting pedestrians identified as experiencing impaired decision-making capabilities. In one embodiment, a method includes determining, from interaction data collected by a user device of a pedestrian, an interaction characteristic of the pedestrian. The method also includes classifying the pedestrian as in an impaired decision-making state based on the interaction characteristic of the pedestrian deviating from baseline interaction data. The method further includes producing a pedestrian assistance countermeasure responsive to a determined impaired decision-making state for the pedestrian.

20 Claims, 6 Drawing Sheets

(56) References Cited

U.S. PATENT DOCUMENTS

| | | |
|---|---|---|
| 10,782,138 B2 | 9/2020 | Kaiser et al. |
| 10,885,785 B2 | 1/2021 | Xu et al. |
| 10,971,003 B2 | 4/2021 | Busch et al. |
| 2015/0109149 A1* | 4/2015 | Duncan .................. G02B 27/01 340/944 |
| 2019/0200915 A1 | 7/2019 | Baker et al. |
| 2020/0151440 A1* | 5/2020 | Wang ..................... G06N 5/048 |
| 2020/0275243 A1* | 8/2020 | Ueno ..................... H04W 40/22 |
| 2020/0367816 A1 | 11/2020 | Panneer Selvam |
| 2021/0070322 A1* | 3/2021 | Noy ....................... G06V 20/58 |
| 2021/0118303 A1* | 4/2021 | Chan ...................... G08G 1/166 |
| 2022/0022747 A1 | 1/2022 | Malfavon |
| 2022/0242453 A1* | 8/2022 | Hahn ..................... G08G 1/166 |

\* cited by examiner

SYSTEMS AND METHODS FOR DETECTING IMPAIRED DECISION-MAKING PEDESTRIANS

TECHNICAL FIELD

The subject matter described herein relates, in general, to providing pedestrian assistance and, more particularly, to identifying and assisting pedestrians who are indicated as experiencing impaired decision-making capabilities.

BACKGROUND

Vehicle roadways and the adjacent infrastructure are becoming increasingly complex and populated with motorists and pedestrians. This is perhaps most apparent in urban areas with significant population and vehicle densities. As both vehicles and pedestrians are in close proximity to one another based on their respective utilization of roadways and adjacent infrastructure elements (e.g., sidewalks) and the occasional occupation of the roadways by pedestrians (such as at crosswalks), vehicles and pedestrians will inevitably interact with one another. For example, a pedestrian may desire to cross a road to reach an intended destination. Pedestrians generally use crosswalks to traverse the road to reach their destination safely.

Some factors may negatively impact the safety of such pedestrian/vehicle interactions. For example, a pedestrian may exhibit impaired decision-making for various reasons, including fatigue, stress, distraction, or medical incapacity. Whatever the cause, pedestrians with impaired decision-making may face challenges in safely navigating busy streets and intersections, assessing potential risks, and making sound judgments about their surroundings. For example, a pedestrian may improperly evaluate the distance and speed of an oncoming vehicle and mistakenly predict they can cross the road before the vehicle reaches the intersection. As a result, these pedestrians may be at an increased risk of accident or injury due to poor decision-making or impaired cognitive function. Moreover, these pedestrians with impaired decision-making may also struggle with planning and executing trips, impacting their ability to travel independently. For example, pedestrians with decision-making impairments may make poor decisions about which routes to take and may select a route that leads the pedestrian to a dangerous part of town.

SUMMARY

In one embodiment, example systems and methods relate to a manner of improving pedestrian safety in busy roadway environments.

In one embodiment, a pedestrian assistance system for promoting the safety of pedestrians exhibiting impaired decision-making is disclosed. The pedestrian assistance system includes one or more processors and a memory communicably coupled to the one or more processors. The memory stores instructions that, when executed by the one or more processors, cause the one or more processors to determine, from interaction data collected by a user device of a pedestrian, an interaction characteristic of the pedestrian. The memory also stores instructions that, when executed by the one or more processors, cause the one or more processors to classify the pedestrian as in an impaired decision-making state based on the interaction characteristic of the pedestrian deviating from baseline interaction data. The memory further stores instructions that, when executed by the one or more processors, cause the one or more processors to produce a pedestrian assistance countermeasure responsive to a determined impaired decision-making state for the pedestrian.

In one embodiment, a non-transitory computer-readable medium for assisting pedestrians exhibiting impaired decision-making and including instructions that, when executed by one or more processors, cause the one or more processors to perform one or more functions is disclosed. The instructions include instructions to 1) determine, from interaction data collected by a user device of a pedestrian, an interaction characteristic of the pedestrian, 2) classify the pedestrian as in an impaired decision-making state based on the interaction characteristic of the pedestrian deviating from baseline interaction data, and 3) produce a pedestrian assistance countermeasure responsive to a determined impaired decision-making state for the pedestrian.

In one embodiment, a method for assisting pedestrians exhibiting impaired decision-making is disclosed. In one embodiment, the method includes determining, from interaction data collected by a user device of a pedestrian, an interaction characteristic of the pedestrian. The method also includes classifying the pedestrian as in an impaired decision-making state based on the interaction characteristic of the pedestrian deviating from baseline interaction data. The method also includes producing a pedestrian assistance countermeasure responsive to a determined impaired decision-making state for the pedestrian.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
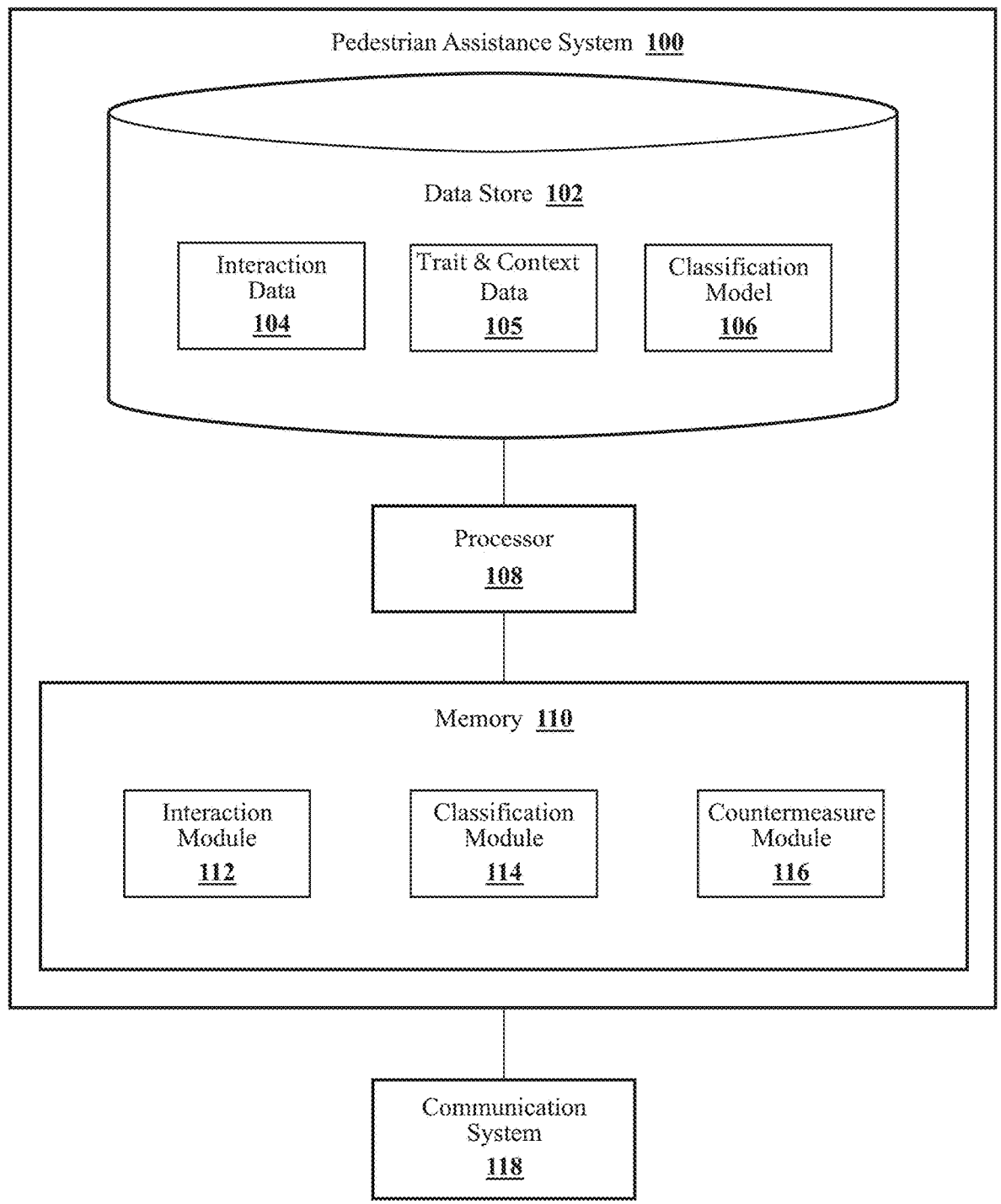
FIG. 1 illustrates one embodiment of a pedestrian assistance system associated with assisting pedestrians exhibiting impaired decision-making.

Systems, methods, and other embodiments associated with improving pedestrian safety when exhibiting impaired decision-making are disclosed herein. As previously described, pedestrians regularly interact with motor vehicles, for example, on busy streets and/or intersections. While typically involving a degree of risk to a pedestrian, these environments can be safely handled. Such navigation, however, relies on the presence of mind and awareness of the pedestrians and motorists in vehicles. Accordingly, a pedestrian exhibiting impaired decision-making increases the risk to the pedestrian and others who utilize the roadway. Pedestrians may exhibit impaired decision-making for various reasons and may face various challenges navigating busy streets and intersections.

As such, the disclosed systems, methods, and other embodiments diagnose pedestrian decision-making impairments and assist these pedestrians. The system identifies decision-making impairments in a pedestrian by analyzing the interaction behavior of the pedestrian. In one example, the system determines that a pedestrian is experiencing impaired decision-making by analyzing phone usage/interactions of the pedestrian. For example, a pedestrian who is having difficulty composing a text/email/social media post, as indicated by the pedestrian repeatedly typing and deleting the text/email/social media post before sending it and/or reading the text/email/social media post repeatedly before sending it, is likely experiencing impaired decision-making.

The system may also use the context of the message/live call and/or who the pedestrian is talking to in determining whether the pedestrian is experiencing impaired decision-making. For example, suppose the pedestrian is attempting to compose a work email while showing signs of indecisiveness. In that case, it is less likely to be a sign of impaired decision-making than if the pedestrian is attempting to compose a text to a family member/friend while showing signs of indecisiveness. The system may also use the movement behavior of the pedestrian to diagnose impaired decision-making. For example, a pedestrian pacing back and forth before crossing a street may be more likely to be experiencing impaired decision-making than a pedestrian who is standing still. As another example, the system may determine that the pedestrian is experiencing impaired decision-making when walking into a particularly dangerous part of town or away from the pedestrian's usual route/destination.

In one example, the system is a machine-learning system that compares the behavior of the pedestrian to the baseline behavior of the pedestrian. The baseline behavior of the pedestrian may be determined by analyzing the pedestrian over a period of time. As a specific example, it may be expected for a particular pedestrian to pace back and forth or to be indecisive while composing texts to a family member. Accordingly, while these behaviors may indicate impaired decision-making for the general population, the system determines that this particular pedestrian is not experiencing impaired decision-making in the presence of these behaviors due to the baseline behavior of the pedestrian.

In any case, if the decision-making patterns meet a critical threshold (i.e., where the critical threshold is a level at which the impairment could lead to pedestrian harm), the system provides one of several pedestrian assistance countermeasures, such as encouraging the pedestrian to seek professional help, encouraging the pedestrian to take caution due to the state of the pedestrian, asking the pedestrian to confirm that they desire to enter a certain part of town, and suggesting the use of helpful device applications (e.g., navigational applications to assist the pedestrian in getting to a desired location). The system may also share the location of the decision-impaired pedestrian with a central server, other vehicles, or local authorities. As other examples, the system may generate 1) recommendations to a human vehicle operator (e.g., decreasing the speed, rerouting navigation, increasing sonar sensitivity, decreasing music) or 2) command instructions to an autonomous vehicle system (e.g., rolling up windows, modifying the acceleration profile to allow the vehicle to be quieter near the pedestrian, and modifying the breaking profile to allow the vehicle to be quieter) and/or infrastructure element (e.g., alerting other pedestrians through phone or digital billboard alerts, rerouting traffic, providing extra time for pedestrian to cross, and rerouting a pedestrian).

In one particular example, multiple pedestrians experiencing decision-making impairments at a certain location may indicate a traffic incident or other event causing widespread confusion among multiple pedestrians. As such, this information may be provided to a third party, such as city authorities, to remedy as needed.

In this way, the disclosed systems, methods, and other embodiments improve pedestrian safety by diagnosing pedestrians exhibiting impaired decision-making and providing notifications or instructions to multiple entities near the impaired pedestrian. As such, the negative impact of a cognitively-impaired pedestrian, whether from stress, fatigue, distraction, or other circumstances, is reduced as the pedestrian is notified of their state, as are the vehicles and infrastructure elements in the immediate vicinity of the impaired pedestrian. As such, the present systems, methods, and other embodiments not only recognize decision-making impairments but also 1) notify the pedestrian with impairments, 2) provide suggestions on how to travel safely, and 3) share the data about the location/cause of impairments with interested parties.

Turning now to the figures, FIG. 1 illustrates one embodiment of a pedestrian assistance system 100 that is associated with assisting pedestrians exhibiting impaired decision-making. It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, the pedestrian assistance system 100 is implemented to perform methods and other functions as disclosed herein relating to improving pedestrian safety, even when the pedestrian is exhibiting impaired decision-making.

With reference to FIG. 1, one embodiment of the pedestrian assistance system 100 is illustrated. The pedestrian assistance system 100 is shown as including a processor 108. In one or more arrangements, the processor(s) 108 can be a primary/centralized processor of the pedestrian assistance system 100 or may be representative of many distributed processing units. For instance, the processor(s) 108 can be an electronic control unit (ECU). Alternatively, or additionally, the processor(s) 108 include a central processing unit (CPU), a graphics processing unit (GPU), an ASIC, a microcontroller, a system on a chip (SoC), and/or other electronic processing unit. As will be discussed in greater detail subsequently, the pedestrian assistance system 100, in various embodiments, may be implemented as a cloud-based service.

In one embodiment, the pedestrian assistance system 100 includes a memory 110 that stores an interaction module 112, a classification module 114, and a countermeasure module 116. The memory 110 is a random-access memory (RAM), read-only memory (ROM), a hard-disk drive, a flash memory, or another suitable memory for storing the modules 112, 114, and 116. In alternative arrangements, the modules 112, 114, and 116 are independent elements from the memory 110 that are, for example, comprised of hardware elements. Thus, the modules 112, 114, and 116 are alternatively ASICs, hardware-based controllers, a composition of logic gates, or another hardware-based solution.

In at least one arrangement, the modules 112, 114, and 116 are implemented as non-transitory computer-readable instructions that, when executed by the processor 108, implement one or more of the various functions described herein. In various arrangements, one or more of the modules 112, 114, and 116 are a component of the processor(s) 108, or one or more of the modules 112, 114, and 116 are executed on and/or distributed among other processing systems to which the processor(s) 108 is operatively connected.

Alternatively, or in addition, the one or more modules 112, 114, and 116 are implemented, at least partially, within hardware. For example, the one or more modules 112, 114, and 116 may be comprised of a combination of logic gates (e.g., metal-oxide-semiconductor field-effect transistors (MOSFETs)) arranged to achieve the described functions, an application-specific integrated circuit (ASIC), programmable logic array (PLA), field-programmable gate array (FPGA), and/or another electronic hardware-based implementation to implement the described functions. Further, in one or more arrangements, one or more of the modules 112, 114, and 116 can be distributed among a plurality of the modules described herein. In one or more arrangements, two or more of the modules described herein can be combined into a single module.

In one embodiment, the pedestrian assistance system 100 includes the data store 102. The data store 102 is, in one embodiment, an electronic data structure stored in the memory 110 or another data storage device and that is configured with routines that can be executed by the processor 108 for analyzing stored data, providing stored data, organizing stored data, and so on. Thus, in one embodiment, the data store 102 stores data used by the modules 112, 114, and 116 in executing various functions.

The data store 102 can be comprised of volatile and/or non-volatile memory. Examples of memory that may form the data store 102 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, solid-state drivers (SSDs), and/or other non-transitory electronic storage medium. In one configuration, the data store 102 is a component of the processor(s) 108. In general, the data store 102 is operatively connected to the processor(s) 108 for use thereby. The term "operatively connected," as used throughout this description, can include direct or indirect connections, including connections without direct physical contact.

In one embodiment, the data store 102 stores the interaction data 104 along with, for example, metadata that characterizes various aspects of the interaction data 104. For example, the metadata can include location coordinates (e.g., longitude and latitude), relative map coordinates or tile identifiers, time/date stamps from when the separate interaction data 104 was generated, and so on.

As described above, impaired decision-making may negatively impact a pedestrian's ability to safely navigate busy streets and intersections. For example, a pedestrian who is fatigued or stressed may underappreciate the surrounding environment and inadvertently place themselves in a dangerous situation due to a failure to appropriately assess risks and make sound judgments. In some examples, the decision-making ability of a pedestrian may be determined based on the pedestrian's interactions, which interactions may be communication-based (e.g., verbal or written communications with another individual) or user device-based (e.g., how the pedestrian utilizes their mobile device). For example, difficulty composing a written text message may indicate that the pedestrian is in a state of mind with impaired decision-making faculties. As such, the interaction data 104 may include information indicative of the pedestrian's interactions, whether written or verbal communication interactions or user device and/or application interactions.

In one example, the interaction data 104 includes a recording of audio collected by a microphone of the user device of the pedestrian. That is, a pedestrian may use the user device to call another individual. In this example, audio recordings may be collected by the user device and transmitted to the pedestrian assistance system 100 via a communication system 118 as described below. In another example, the pedestrian may be directly conversing with an individual (i.e., without using a mobile phone). As in the previous example, the microphone of the user device may record the conversation and transmit such to the pedestrian assistance system 100. As described above, the interaction module 112 may rely on such information to determine an interaction characteristic for the pedestrian.

In another example, the interaction data 104 includes written or text messages from the pedestrian and another participant in a messaging environment. That is, mobile phones may be used to generate, send, and receive written text messages. In this example, the pedestrian assistance system 100 collects the text messages from the user device, which may be analyzed and used in part to determine whether the pedestrian is in an impaired decision-making state.

As described above, the interaction data 104 may include metadata associated with the interaction data, such as an identification and relationship of the pedestrian to a participant in the conversation, a subject of the communication, a timestamp of the communication, etc. Such information may be further evidence of the decision-making state of the pedestrian. For example, indecisiveness in professional relationships may be less indicative of impaired decision-making than in personal relationships. Moreover, the subject of the communication may be indicative of the state of mind of the user. That is, certain topics are more prone to induce stress in a pedestrian and, as such, may be more heavily weighted when considering whether a pedestrian is in an impaired decision-making state. While particular reference is made to particular metadata associated with the interaction data 104, other metadata associated with the interaction data 104 may be stored in the data store 102 and relied on in classifying the pedestrian.

As another example, the interaction data 104 may be application-based interaction data. That is, user devices such as smartphones, tablets, music devices, or personal digital assistants (PDAs) include any number of features or applications that the pedestrian may interact with to carry out any number of functions. For example, the pedestrian may access an online shopping portal to purchase goods from a retailer. In this example, the interaction data 104 may reflect interactions the pedestrian has with the user device and/or the application. In another example, the application is a social media application, and the interaction data 104 represents the pedestrian's activity on the social media application or with other users. For example, users can share messages and comment on posts/images uploaded by other users via social media applications. As with text messages, the interactions of the pedestrian with these other users via social media posts/messages may reflect on the pedestrian's state of mind. As such, the interaction data 104 may include data and metadata reflective of the interactions of the pedestrian with these applications, be they social media or other.

As such, the interaction data 104 generally includes any information indicating a communication interaction the pedestrian has with another individual via written or verbal communication and/or an interaction the pedestrian has with an application of a user device or directly with the user device.

In any case, the interaction data 104 may include a history of the interactions of the pedestrian as described above. That is, a determination regarding the decision-making state of a pedestrian is based, at least in part, on a deviation of current behavior from expected behavior for the pedestrian. For example, a first pedestrian may usually compose text messages with few grammatical and spelling errors and adherence to a particular vocabulary/tone style. At a particular point in time, the interaction data 104 may include a series of temporally related messages from the pedestrian that include more grammatical and spelling errors than expected and that use a vocabulary different from what is expected from the pedestrian. This may indicate that the pedestrian is in an impaired decision-making state. As such, the interaction data 104 includes a history of the interactions of the pedestrian to form a baseline against which current interaction characteristics of the pedestrian are compared to determine whether the pedestrian is in a cognitively-impaired state.

Moreover, the interaction data 104 may include interaction data for several additional users. As described above, the pedestrian assistance system 100 may identify deviations of current interaction characteristics from baseline interaction patterns to identify an impaired decision-making state. As described above, such a comparison may be between current interaction characteristics and baseline interaction patterns for the pedestrian. In another example, such a comparison may be between current interaction characteristics for the pedestrian and baseline interaction patterns for a general body of individuals. For example, some indicia of impaired decision-making may be pervasive across a general or regional population. For example, certain linguistic behaviors, such as extensive use of filler words, may be more widely indicative of impaired decision-making. As such, the interaction data 104 may include interaction data for additional users such that the classification module 114 may classify the pedestrian more accurately based on many data points (e.g., baseline behavior of the pedestrian and baseline behavior of a more general population).

In an example, the additional users for which interaction data 104 is collected include participants in written or verbal communication with the pedestrian. That is, the conversational characteristics of the pedestrian and the other conversant indicate the pedestrian's decision-making state. For example, non-pedestrian conversant phrases such as, "are you okay?" and "this doesn't seem like you" may indicate the pedestrian's state of mind. As such, in addition to recording pedestrian communication data, the user device may include the communication data for other participants in the conversation.

A user device, such as a smartphone, mobile phone, tablet, or other device, collects the interaction data 104. As such, the pedestrian assistance system 100 includes a communication system 118 to receive the interaction data 104 from the user devices of the pedestrian and other pedestrians. In one embodiment, the communication system 118 communicates according to one or more communication standards. For example, the communication system 118 can include multiple different antennas/transceivers and/or other hardware elements for communicating at different frequencies and according to respective protocols. The communication system 118, in one arrangement, communicates via a communication protocol, such as WiFi, DSRC, V2I, V2V, or another suitable protocol for communicating pedestrian assistance system 100 and user devices. Moreover, the communication system 118, in one arrangement, further communicates according to a protocol, such as a global system for mobile communication (GSM), Enhanced Data Rates for GSM Evolution (EDGE), Long-Term Evolution (LTE), 5G, or another communication technology that provides for the user devices communicating with various remote devices (e.g., a cloud-based server). In any case, the pedestrian assistance system 100 can leverage various wireless communication technologies to provide communications to other entities, such as members of the cloud-computing environment.

In one embodiment, the data store 102 further includes trait and context data 105. As with the interaction data 104, trait and context data 105 may indicate the pedestrian's state of mind. For example, pacing, deviating from an expected route, and traveling through a dangerous part of town may indicate impaired decision-making. As another example, a walking posture/pace may indicate a pedestrian's state of mind. Still further, contextual information such as ambient light and regular routines may indicate a pedestrian's state of mind. As such, the data store 102 includes trait and context data 105, which is indicative of the movement of the pedestrian, characteristics of the pedestrian, and contextual information, and which is also received via a user device of a pedestrian and/or infrastructure/vehicle mounted sensors via a communication system 118. In an example, the trait and context data 105 is received from a different user device or the same user device from which the interaction data 104 is collected. For example, a mobile phone may include a global positioning system (GPS) from which the location of the pedestrian may be determined. In another example, the mobile phone may include an accelerometer to determine the fine-grained movement of the pedestrian. This fine-grained movement data may indicate whether the pedestrian is pacing or not.

In another example, the movement data, which forms part of the trait and context data 105, may be collected by another device, such as a wearable health monitor device such as a smartwatch. In either example, the trait and context data 105, like the interaction data 104, may include a historical behavior record. As described above, this historical record forms a baseline against which currently measured data is compared to determine whether the pedestrian is experiencing decision-making impairment. For example, the historical location data for the pedestrian may be used to determine whether the pedestrian deviates from a regular or expected route. As another example, the historical trait and context data may indicate whether the pedestrian habitually paces, such that a current identification of pedestrian pacing may accurately be evaluated as an indicator of impaired decision-making.

Moreover, like the interaction data 104, the trait and context data 105 may include trait and context data for additional users, such as a general or regional population, as such information may be relied on in determining whether the pedestrian is engaging in impair-based movements or movements that are to be expected given historical data for the general or regional population.

The data store 102 also includes a classification model 106, which may be relied on by the classification module 114 to classify the pedestrian. The pedestrian assistance system 100 may be a machine-learning system. A machine-learning system generally identifies patterns and/or deviations based on previously unseen data. In the context of the present application, a machine-learning pedestrian assistance system 100 relies on some form of machine learning, whether supervised, unsupervised, reinforcement, or any other type, to determine whether the pedestrian is in an impaired decision-making state of mind based on the observed interaction characteristics of the pedestrian. In an example, the classification model 106 is a supervised model where the machine learning is trained with an input data set and optimized to meet a set of specific outputs. In another example, the classification model 106 is an unsupervised model where the model is trained with an input data set but not optimized to meet a set of specific outputs; instead, it is trained to classify based on common characteristics. As another example, the classification model 106 may be a self-trained reinforcement model based on trial and error. In any case, the classification model 106 includes the weights (including trainable and non-trainable), biases, variables, offset values, algorithms, parameters, and other elements that operate to output a classification for the pedestrian based on any number of input values. Examples of machine-learning models include, but are not limited to, logistic regression models, Support Vector Machine (SVM) models, naïve Bayes models, decision tree models, linear regression models, k-nearest neighbor models, random forest models, boosting algorithm models, and hierarchical clustering models. While particular models are described herein, the classification model 106 may be of various types intended to classify pedestrians based on determined interaction characteristics.

The pedestrian assistance system 100 further includes an interaction module 112 which, in one embodiment, includes instructions that cause the processor 108 to determine an interaction characteristic of a pedestrian from interaction data 104 collected by a user device of a pedestrian. As described above, a pedestrian interacts with other individuals, websites, applications, etc., via a user device. The interaction module 112 analyzes the interaction data 104 to identify characteristics of the interaction, which characteristics are distinguishing features of the interaction.

The interaction module 112 identifies different interaction characteristics based on the type of interaction. For example, the interaction module 112 may include instructions that cause the processor 108 to determine at least one of a verbal communication characteristic or a written communication characteristic of the pedestrian. Examples of verbal communication characteristics include speed, volume, pitch, pronunciation, fluency, articulation, word choice, use of filler words, grammatical errors, pauses between words/phrases, etc. While particular reference is made to particular verbal communication characteristics, the interaction module 112 may identify other interaction characteristics based on the interaction data 104. Examples of written communication characteristics include punctuation, grammar, speed of generating a written message, duration between generation and transmission, repetition of generating a message before transmitting (i.e., deleting and re-composing a message), etc. While particular reference is made to particular written communication characteristics, the interaction module 112 may identify other features of written communication. As such, the interaction module 112 analyzes the interaction data 104, which may include recordings of written and verbal communications, to identify these characteristics of the pedestrian's interactions.

As described above, the interaction data 104 may include application-based and/or user device-based data. That is, a user device may include any number of applications that facilitate interaction with other individuals and/or entities. As a particular example, a social media application or a web browser may allow a user to post, comment on, or message other individuals and/or organizations. As another example, a retail application or a web browser may allow a user to purchase goods from a retailer. In either of these examples, interaction data 104 associated with the application interactions also has characteristics that may reflect the pedestrian state of mind. For example, a user repeatedly putting something in an electronic shopping cart and then removing it from the electronic shopping cart before purchasing may be indicative of an indecisive pedestrian. Other examples of application-based interaction characteristics include, but are not limited to, temporal-based characteristics (i.e., quantity of interactions in a period), frequency of interactions, volume of interactions, etc. While particular reference is made to particular application interaction characteristics, the interaction module 112 may identify other characteristics of application interaction. As such, the interaction module 112 may include instructions that cause the processor 108 to determine a characteristic of a pedestrian's interaction with an application of the user device. In summary, the interaction module 112 analyzes the interaction data 104 to identify characteristics of the pedestrian's interactions, in some cases analyzing the interaction data 104 and the metadata associated with the interaction data.

As described above, the interaction module 112 relies on interaction data 104. As such, the interaction module 112 generally includes instructions that function to control the processor 108 to receive interaction data 104 inputs from one or more user devices. Accordingly, the interaction module 112, in one embodiment, controls the respective devices to provide the data inputs in the form of the interaction data 104. Additionally, while the interaction module 112 is discussed as controlling the various devices to provide the interaction data 104, in one or more embodiments, the interaction module 112 can employ other techniques to acquire the interaction data 104 that are either active or passive.

The pedestrian assistance system 100 further includes a classification module 114 which, in one embodiment, includes instructions that cause the processor 108 to classify the pedestrian as in an impaired decision-making state based on the interaction characteristic of the pedestrian deviating from baseline interaction data. That is, certain interaction characteristics are indicative of an impaired decision-making state. For example, verbal speech characterized by long, frequent pauses between words may indicate indecisiveness. As another example, repeatedly composing and then deleting a text message before sending the text message may also be indicative of indecisiveness. These traits (e.g., pauses between words in verbal communication and repetitive composing and deleting of a text message) and others are captured in the interaction data 104 and identified by the interaction module 112. The identified interaction characteristics are used by the classification module 114 to identify those pedestrians suffering from impaired decision-making. In an example, the classification module 114 includes instructions that cause the processor 108 to identify when the pedestrian is having difficulty composing at least one of a verbal communication or a written communication. Given the relationship between interaction characteristics and impaired decision-making and impaired decision-making and pedestrian safety, classifying the pedestrian based on interaction characteristics may lead to increased pedestrian safety.

In an example, the classification depends on a deviation of a measured interaction characteristic from baseline interaction data, which baseline interaction data may pertain to either the pedestrian or other individuals such as a regional or broad public. As such, the baseline interaction data may include interaction data 104 and associated metadata collected from the user device of the pedestrian and user devices of other users. The baseline data may take various forms and generally reflects the historical interaction patterns of those for whom it is collected. As specific examples, the baseline verbal/written interaction data may include historical verbal/written patterns of speaking cadence, speaking speed, speaking volume, speaking pitch, speaking pronunciation, speaking fluency, speaking articulation, word choice, use of filler words, grammatical errors, spacing between words/phrases, written punctuation, written grammar, speed of generating a written message, duration between generation and transmission of a message, repetition of generating a message before transmitting (i.e., deleting and re-composing a message), etc.

In the case of application-based characteristics, the baseline interaction may indicate an individual's usual application interaction characteristics, such as frequency and rate of interaction, online shopping behavior, and other information. Again, while particular reference is made to particular interaction characteristics, the baseline interaction data may include other data indicative of interaction patterns for the pedestrian and/or other individuals.

By comparing a current interaction characteristic against this baseline interaction data, the classification module 114 can classify the pedestrian. For example, measured interaction characteristics of increased speaking speed and volume with more filler words and greater pauses between words as compared to baseline interaction data for a pedestrian may indicate that the pedestrian is in an impaired decision-making state, and as such, a recommended countermeasure should be produced. As a specific example, specific words and phrases such as "I'm not feeling like myself" or "I'm feeling dizzy" may be atypical for a particular user as defined by the baseline interaction data. As another example, interaction data 104 may indicate that a pedestrian is calling a manager at 3:00 a.m. on a Sunday. In contrast, baseline data indicates that the pedestrian typically calls a manager between 8:00 a.m. and 6:00 p.m. between Mondays and Fridays. Based on this deviation, the classification module 114 may classify the pedestrian as experiencing impaired decision-making.

As such, when the interaction module 112 identifies these phrases, the classification module 114 may identify these as atypical and weigh them as such when classifying a pedestrian.

In an example, the baseline interaction data may be classified based on metadata associating the baseline characteristic data with the states of mind of the pedestrian. Put another way, the baseline interaction data may include baseline interaction data for the pedestrian and other users when unimpaired and baseline interaction data for the pedestrian and other users when identified as in an impaired decision-making state. For example, measured interaction data may be compared against baseline interaction data when the pedestrian experienced impaired decision-making to identify similarities in the data set to determine whether a user is experiencing impaired decision-making. By comparison, measured interaction data may be compared against baseline interaction data when the pedestrian is not experiencing impaired decision-making to identify deviations in the data set.

As described above, the baseline interaction data may include similar data for a body of users, geospatially related or unrelated to the pedestrian. That is, historical interaction patterns, and in some cases, an associated decision-making impairment state, for a general population or a subset of the general population that is in the same region as the pedestrian (i.e., a regional population) may serve as a baseline for comparison of measured interaction characteristics. In other words, the classification module 114, which may be a machine-learning module, identifies behavior patterns in the expected behavior of the pedestrian and/or other users and determines when the pedestrian's current behavior deviates or aligns with those patterns. Those deviations and the characteristics of the deviation (e.g., number of deviations, frequency of deviations, degree of deviations) are relied on in classifying the pedestrian to a particular decision-making state.

Whatever data is included in the baseline interaction data (e.g., historical patterns of the pedestrian, historical patterns of a broader population, or both), the classification module 114 classifies the pedestrian based on deviations from measured interaction characteristics against the baseline interaction data. Specifically, the classification module 114 may include instructions that cause the processor 108 to classify the pedestrian based on at least one of 1) a degree of deviation between the interaction characteristic and the baseline interaction data and 2) a number of deviations between interaction characteristics and the baseline interaction data within a period of time. That is, certain deviations from an expected behavior (i.e., the baseline interactions) may not indicate impaired decision-making but may be attributed to natural variation. Accordingly, the classification module 114 may include a deviation threshold against which the deviations are compared to classify the pedestrian's decision-making state. Specifically, the classification module 114 may be a machine-learning module that considers the quantity of deviations over time to classify the pedestrian.

In an example, the classification module 114 considers the context of the interaction when classifying the pedestrian. For example, in an application-based classification, the classification module 114 may consider the type of purchase being made. As a specific example, a pedestrian making a high dollar-value purchase may be more cautious than when purchasing a cheaper product. As such, a pedestrian making a high dollar-value purchase may be expected to experience a considerable amount of deliberation, which by itself may not be indicative of indecisiveness. The same amount of back-and-forth when purchasing a low-cost item may be more indicative of indecisiveness. As another example, a pedestrian making multiple expensive purchases for casual acquaintances may indicate an impaired state of mind for the pedestrian. Accordingly, this information captured in the interaction data 104 and associated metadata may be considered by the classification module 114 when classifying a pedestrian.

Contextual information may also indicate a decision-making state that is impaired in the context of verbal or written communication. Examples of contextual information in the verbal or written communication interactions include the content of the communication, the subject matter of the communication, a relationship between participants in the communication, the date/time of the communication, an emotive state of the communication, etc. As such, the classification module 114 may perform semantic, keyword, emotive, or another type of textual analysis operations to identify and consider the context of communication when classifying the pedestrian. As such, the classification module 114 includes instructions to classify the pedestrian as in the impaired decision-making state based on a determined context of the verbal communication, the written communication, or the application interaction, which context may be included in the interaction data 104 or otherwise extracted/determined by the classification module 114.

In addition to interaction data 104 and associated metadata, the classification module 114 may classify the pedestrian as in an impaired decision-making state based on the physical traits (e.g., movements and characteristics) of the pedestrian as well as contextual environmental data. That is, similar to conversational and application interactions, certain physical movements and characteristics and environmental conditions may be indicative of impaired decision-making. For example, a pedestrian pacing back and forth may be an expression of stress and/or fatigue, both of which are indicative of indecisiveness. As another example, pedestrian gestures, such as the waving of arms, may be an expression of stress or anger, which are markers of indecisiveness. As another example, a posture trait of a pedestrian and the use of walking aids such as canes or wheelchairs may be considered, as posture and walking aids may affect the pedestrian's pace. Other physical movements that may be found in the trait and context data 105 and that are indicative of impaired decision-making include facial and eye movements.

In an example, context data is also relied on in determining impaired decision-making. Examples of context data that may be stored as trait and context data 105 include 1) sleep/active ratio (i.e., as measured by a health monitoring device or application on a user device), 2) a measured time of day vs. a regular wake/sleep schedule for the pedestrian, c) ambient illumination, d) familiarity with an environment, and/or c) food intake/metabolism. As other examples of context data include mismatched shoes, a shirt/jacket that is inside out, or a backpack/purse that is open and from which objects are falling and the pedestrian does not appear to notice.

In these and other examples, the pedestrian assistance system 100 may receive such trait and context data 105 from sensors such as cameras (e.g., on the vehicles or infrastructure elements in the vicinity of the pedestrian), health monitoring devices, health monitoring applications on a user device, or any other sensor via the communication system 118.

As such, the classification module 114 may receive trait and context data 105 and determine a user decision-making state based on such. Accordingly, in one embodiment, the classification module 114 includes instructions that, when executed by the processor 108, cause the processor 108 to acquire the interaction characteristics from the interaction module 112 and the trait and context data 105 from the data store 102.

In one approach, the classification module 114 implements and/or otherwise uses a machine learning algorithm.

A machine-learning algorithm generally identifies patterns and deviations based on previously unseen data. In the context of the present application, a machine-learning classification module 114 relies on some form of machine learning, whether supervised, unsupervised, reinforcement, or any other type of machine learning, to determine whether the pedestrian is in an impaired decision-making state of mind based on 1) the observed interaction characteristics of the pedestrian, 2) a comparison of the observed interaction characteristics to historical patterns for the pedestrian and/or other users, 3) context data associated with the interaction characteristics, and/or 4) trait and context data of the pedestrian.

In one configuration, the machine learning algorithm is embedded within the classification module 114, such as a convolutional neural network (CNN) or an artificial neural network (ANN) to perform pedestrian classification over the interaction data 104 and trait and context data 105, from which further information is derived. Of course, in further aspects, the classification module 114 may employ different machine learning algorithms or implement different approaches for performing the pedestrian classification which can include logistic regression, a naïve Bayes algorithm, a decision tree, a linear regression algorithm, a k-nearest neighbor algorithm, a random forest algorithm, a boosting algorithm, and a hierarchical clustering algorithm among others to generate pedestrian classifications. Other examples of machine learning algorithms include, but are not limited to, deep neural networks (DNN), including transformer networks, convolutional neural networks, recurrent neural networks (RNN), etc., Support Vector Machines (SVM), clustering algorithms, Hidden Markov Models, and so on. It should be appreciated that the separate forms of machine learning algorithms may have distinct applications, such as agent modeling, machine perception, and so on.

Whichever particular approach the classification module 114 implements, the classification module 114 provides an output with pedestrian decision-making classifications indicated in the interaction data 104 and the trait and context data 105. In this way, the classification module 114 identifies pedestrians in states of mind that may negatively impact their safety such that appropriate countermeasures may be provided to reduce the likelihood of an unsafe environment surrounding the pedestrian.

Moreover, it should be appreciated that machine learning algorithms are generally trained to perform a defined task. Thus, the training of the machine learning algorithm is understood to be distinct from the general use of the machine learning algorithm unless otherwise stated. That is, the pedestrian assistance system 100 or another system generally trains the machine learning algorithm according to a particular training approach, which may include supervised training, self-supervised training, reinforcement learning, and so on. In contrast to training/learning of the machine learning algorithm, the pedestrian assistance system 100 implements the machine learning algorithm to perform inference. Thus, the general use of the machine learning algorithm is described as inference.

It should be appreciated that the classification module 114, in combination with the classification model 106, can form a computational model such as a neural network model. In any case, the classification module 114, when implemented with a neural network model or another model, in one embodiment, implements functional aspects of the classification model 106 while further aspects, such as learned weights, may be stored within the data store 102. Accordingly, the classification model 106 is generally integrated with the classification module 114 as a cohesive functional structure. Additional details regarding the machine-learning operation of the classification module 114 and classification model 106 are provided below in connection with FIGS. 3 and 4.

The pedestrian assistance system 100 further includes a countermeasure module 116 which, in one embodiment, includes instructions that cause the processor 108 to produce a pedestrian assistance countermeasure responsive to a determined impaired decision-making state for the pedestrian. That is, safe navigation of busy streets, intersections, and other roadway infrastructure elements depends on the decisions pedestrians and motorists make. As such, impaired decision-making negatively impacts not only the safety of the pedestrian but also that of other motorists and bystanders. Accordingly, the countermeasure module 116 may produce a countermeasure to offset or preclude the dangerous circumstances that may arise when a pedestrian is exhibiting impaired decision-making.

The pedestrian assistance countermeasure may take a variety of forms. In one example, the countermeasure may be a notification provided to the pedestrian via a user device of the pedestrian. For example, the countermeasure may be a message to the pedestrian to seek professional help, to take caution due to the state of the pedestrian, prompting the pedestrian to confirm a particular course of action (e.g., navigating a particular area of town), or suggesting the use of certain user device applications such as a navigation application to assist the pedestrian in arriving at a desired destination. In this example, the countermeasure module 116 may transmit a message to the user device via the communication system 118.

In addition to notifying the pedestrian, the countermeasure module 116 may generate a notification for other entities in the vicinity of the pedestrian. For example, the countermeasure module 116 may generate a notification to a human vehicle operator, an autonomous vehicle system, or an infrastructure element. These notifications may apprise the respective party/element of the presence of the impaired pedestrian so certain remedial actions can be executed to protect the pedestrian and others in the vicinity of the pedestrian. For example, a notification may be provided to a human vehicle operator so that the operator may slow down their vehicle to avoid any dangerous circumstances. Again, such notification may be transmitted to the human vehicle operator user device, manually-operated vehicle interface, autonomous vehicle system, or infrastructure element via the communication system 118 of the pedestrian assistance system 100.

In addition to notifying the entities in the vicinity of the pedestrian of the pedestrian's impaired decision-making state, the countermeasure module 116, in some examples, includes instructions that cause the processor 108 to produce a command signal for at least one of a vehicle in a vicinity of the pedestrian or an infrastructure clement in the vicinity of the pedestrian. That is, as vehicles and infrastructure elements come within a threshold distance of the pedestrian, a communication path, such as a vehicle-to-pedestrian (V2P) or pedestrian-to-infrastructure communication path, may be established between the pedestrian and vehicles and/or infrastructure elements. In this example, the network membership may change based on the movement of the vehicles and/or pedestrians. In any event, via this network and the communication system 118 link between the pedestrian assistance system 100 and the entities of the cloud-based environment, command signals may be transmitted to the various entities, which command signals control the operation of the respective device to increase pedestrian/motorist safety. As a particular example, a command signal to a vehicle in the vicinity of the pedestrian may instruct the vehicle to decrease its speed when in the vicinity of the pedestrian. As another example, the command signal may generate a notification of the pedestrian on a digital billboard. While particular reference is made to particular command signals, other command signals may be generated by the countermeasure module 116. Additional examples are provided below in connection with FIG. 2. In any example, the command signal is transmitted to the respective entity via the communication system 118.

As such, the pedestrian assistance system 100 of the present specification collects pedestrian interaction data, identifies characteristics of that data, and relies on the interaction characteristics to identify when the user may be in an impaired decision-making state. Responsive to detecting that a pedestrian is in an impaired decision-making state and potentially putting themselves and others in danger, the pedestrian assistance system 100 produces a countermeasure to offset or preclude the dangerous circumstance created by the pedestrian's impaired decision-making state.

Figure 2:
FIG. 2 illustrates an environment where assistance is provided to a pedestrian exhibiting impaired decision-making.

FIG. 2 illustrates an environment where assistance is provided to a pedestrian 220 exhibiting impaired decision-making. As described above, roadways and the adjacent infrastructure are populated by various moving entities, including pedestrians 220 and vehicles 224. Focus and sound decision-making of all parties ensures the safety of pedestrians 220 and motorists alike. FIG. 2 depicts one particular environment, a road intersection, where pedestrian/motorist safety may be particularly vulnerable. As depicted in FIG. 2, the pedestrian 220 is pacing back and forth and making arm gestures, which may be indicative of a state of mind (e.g., stress, fatigue, or distraction), which can impact the pedestrian's ability to make sound decisions regarding the environment in which they are found. Moreover, the verbal communication characteristics of the pedestrian 220 may further indicate the pedestrian's state of mind as described above. As such, as described above, the pedestrian assistance system 100 may collect interaction data 104 from the user device 222 of the pedestrian and/or trait and context data 105 from the user device 222 or some other pedestrian monitoring device and classify the pedestrian 220 as in a state where their decision-making is impaired.

As described above, responsive to a determination that the pedestrian is experiencing impaired decision-making, the countermeasure module 116 produces any number of countermeasures that promote the safety of the pedestrian 220 and others in the environment. In some examples, the countermeasure is a notification, warning, or alert of the presence of the impaired pedestrian 220 and the pedestrian's determined impaired decision-making state. The notification, warning, or alert may be transmitted to the user device 222, a vehicle 224, or an infrastructure element, of which a traffic light 226 is an example. As a specific example, the pedestrian assistance system 100 may alert vehicles and other pedestrians in the vicinity through infrastructure elements such as digital billboards, external monitors on cars, mobile devices, etc., that they are near/approaching an impaired pedestrian 220. As another specific example, the pedestrian assistance system 100 may alert a driver of the vehicle 224 haptically, visually, or auditorily to exercise additional caution. In one example, the pedestrian assistance system 100 may, via an augmented reality (AR) windshield, draw the driver's attention to the pedestrian by highlighting the pedestrian in the AR display.

In an example, the notification transmitted to the user device 222 of the pedestrian 220 may include instructions to the pedestrian 220. For example, the pedestrian assistance system 100 may send an alert to the user device 222 instructing the pedestrian 220 to cross the intersection if it is determined that there is enough time to do so.

As another example, the pedestrian assistance system 100 may alter the operation of one or more systems and/or applications of the user device 222. For example, the pedestrian assistance system 100 may transmit a command signal to turn on a navigation option to avoid routes disproportionately characterized by high accident rates and/or high traffic or pedestrian volume. As another example, the pedestrian assistance system 100 may transmit a command signal to turn on a navigation option to select routes with a predetermined safety threshold. For example, settings within a navigation application may associate a safety level for different route options. The safety level of a route may be set based on any number of criteria, including illumination levels, public safety, proximity or occurrence of recent crime or crime level, and whether a pedestrian is familiar with an area. In this example, the command signal may select a route with a threshold safety level based on whether or not the pedestrian is in an impaired decision-making state.

As described above, the countermeasure may be a command signal transmitted to a vehicle 224, which command signal changes the operation of the vehicle responsive to an identified pedestrian 220 with impaired decision-making capability. Examples of operational changes triggered by the command signal include, but are not limited to 1) decreasing the vehicle speed in a vicinity of the pedestrian, 2) modifying a braking profile of an automated vehicle to be softer (i.e., brake sooner and more slowly), 3) modifying an acceleration profile of an automated vehicle to be softer (i.e., accelerate more slowly and over a longer distance), 4) allowing for extra space between the vehicle 224 and the pedestrian 220, 5) rerouting the vehicle to avoid being in the vicinity of the pedestrian 220, 6) increasing a clearance sonar sensitivity in the presence of the pedestrian 220, 7) turning off lane departure alerts in the vicinity of the pedestrian, 8) increasing adaptive cruise control distance setting to allow for more space between vehicles, 9) flashing lights at a pedestrian to catch the attention of the pedestrian to alter their decision-making state or encourage certain behavior (e.g., crossing a street), 10) turning down music in the cabin, 11) applying external one-way blackout to windows to prevent pedestrian from seeing inside the vehicle thus simplifying the visual load on the pedestrian 220, 12) turning off non-safety related lights and or sounds to reduce the pedestrian's sensory load, 13) rolling up windows to block out vehicle cabin noise from further distracting/stressing the pedestrian 220, and 14) increasing a frequency of audible alerts (e.g., vehicle horns or other audible messages or notifications) and increase the conspicuity of other external communications (e.g., headlights, turn signals, external displays, and projected messages/symbols onto the crosswalk, road, etc.) to increase the chance of pedestrian 220 perception.

As another example, the command signal could instruct the vehicle 224 to communicate an intent (e.g., a planned maneuver) to the pedestrian 220. In this example, the command signal may further instruct the vehicle 224 to monitor for a pedestrian response to the communicated intent. By so doing, the countermeasure module 116 reduces the risk of danger by verifying that the pedestrian 220 is aware of environmental events.

These command signals may also include countermeasures that are specific to electric vehicles. For example, some electric vehicles include one-pedal driving, where one pedal is used for both acceleration and braking. In this example, the countermeasure may be to adjust the sensitivity of the pedal to be more sensitive so that when the driver releases the acceleration pedal, the vehicle slows down more quickly, thus requiring less braking. As another electric vehicle-specific command signal, the countermeasure module 116 may increase the acoustic vehicle alerting system (AVAS) volume to make detecting an electric vehicle more conspicuous.

Moreover, as described above, the countermeasure may be a command signal transmitted to an infrastructure element such as a traffic light 226. Examples include 1) repeating alerts or increasing the conspicuity of signals to increase the chance of pedestrian 220 perception, 2) altering signals to reroute traffic away from the pedestrian, 3) allowing extra time for the pedestrian 220 to cross at signaled intersections, and 4) turning off traffic signals when no vehicles exist within a defined proximity. While particular reference is made to particular countermeasures, various countermeasures may be implemented to reduce or preclude the events that may arise due to a pedestrian's impaired decision-making state.

Figure 3:
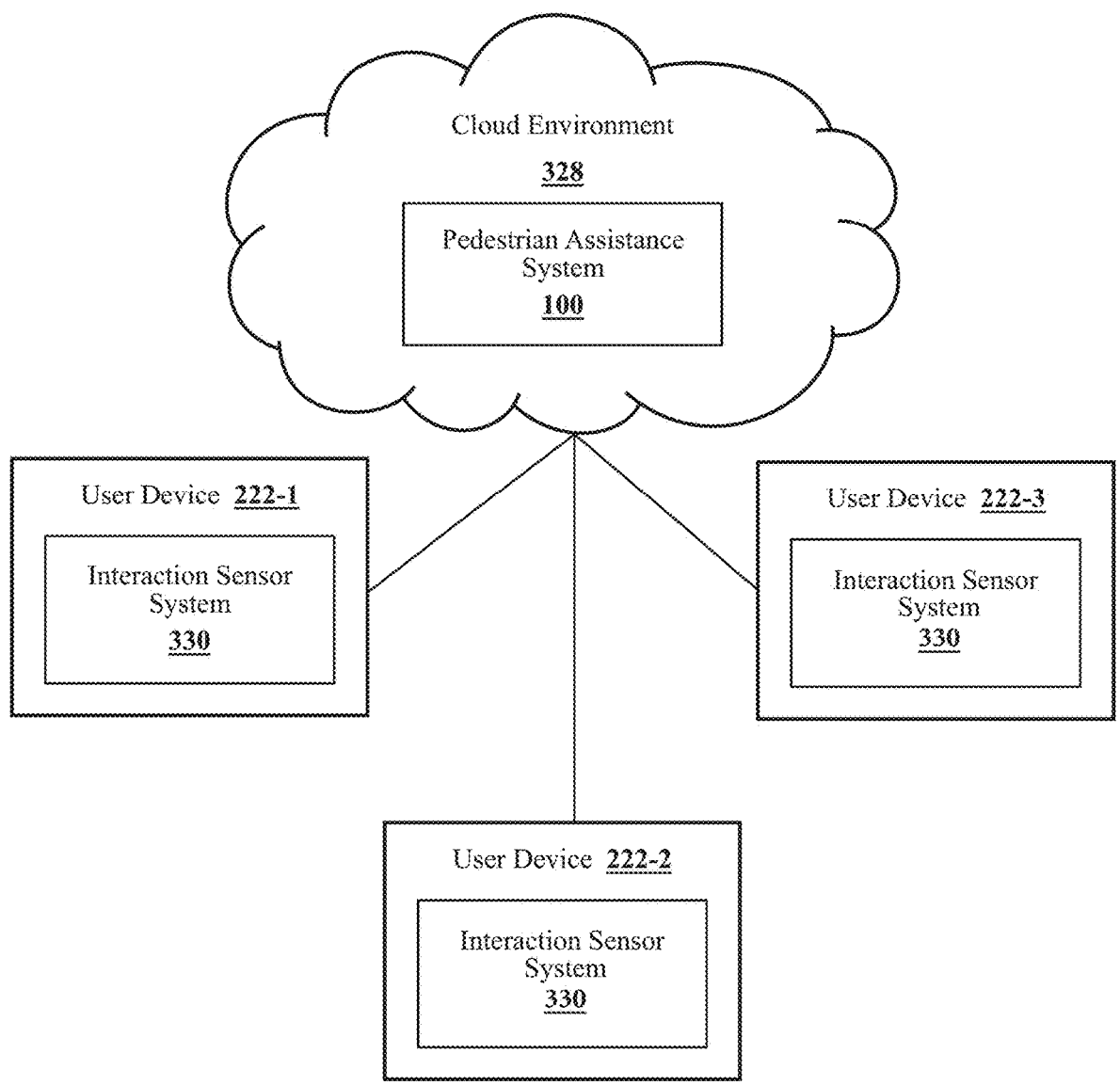
FIG. 3 illustrates one embodiment of the pedestrian assistance system of FIG. 1 in a cloud-computing environment.

FIG. 3 illustrates one embodiment of the pedestrian assistance system 100 of FIG. 1 in a cloud-computing environment 328. As illustrated in FIG. 3, in one example, the pedestrian assistance system 100 is embodied at least in part within the cloud-computing environment 328. The cloud-computing environment 328 itself, as previously noted, is a dynamic environment that comprises cloud members that are routinely migrating into and out of a geographic area. In general, the geographic area, as discussed herein, is associated with a broad area, such as a city and surrounding suburbs. In any case, the area associated with the cloud-computing environment 328 can vary according to a particular implementation but generally extends across a wide geographic area.

As described above, the pedestrian assistance system 100 classifies the pedestrian based on a comparison of the pedestrian's interaction characteristics to the pedestrian's own interaction history or the interaction history of other users. Accordingly, in one or more approaches, the cloud-computing environment 328 may facilitate communications between multiple user devices 222-1, 222-2, 222-3 to acquire and distribute information from the user devices 222 to the pedestrian assistance system 100.

Specifically, the pedestrian assistance system 100 includes instructions that cause the processor 108 to compare the interaction characteristic of the pedestrian 220 to the baseline interaction data, which baseline interaction data may include interaction patterns of the pedestrian 220 and interaction patterns of additional individuals. As such, the pedestrian assistance system 100 is communicatively coupled to the user devices 222 to monitor the interaction patterns of various individuals over time to establish the baseline interaction data. That is, each user device 222 includes an interaction sensor system 330 to monitor verbal communications, written communications, and application interactions as described above. The collected data is transmitted to the pedestrian assistance system 100, specifically to the data store 102 as interaction data 104 and/or trait and context data 105.

Note that the collected information is not limited to that information collected while a user walks. Instead, the interaction data 104 may be collected continuously or discretely regardless of the activity of the pedestrian. As such, a representative dataset of pedestrian-specific and general population interaction patterns is collected and relied on by the classification module 114 to determine the decision-making state of the pedestrian 220. As such, by collecting data from several users, those pedestrians exhibiting impaired decision-making, and who would thus benefit from targeted assistance, are identified and the target assistance is provided. Such a system identifies potentially dangerous situations that may otherwise go unnoticed were interaction characteristics not monitored to determine impaired decision-making.

Figure 4:
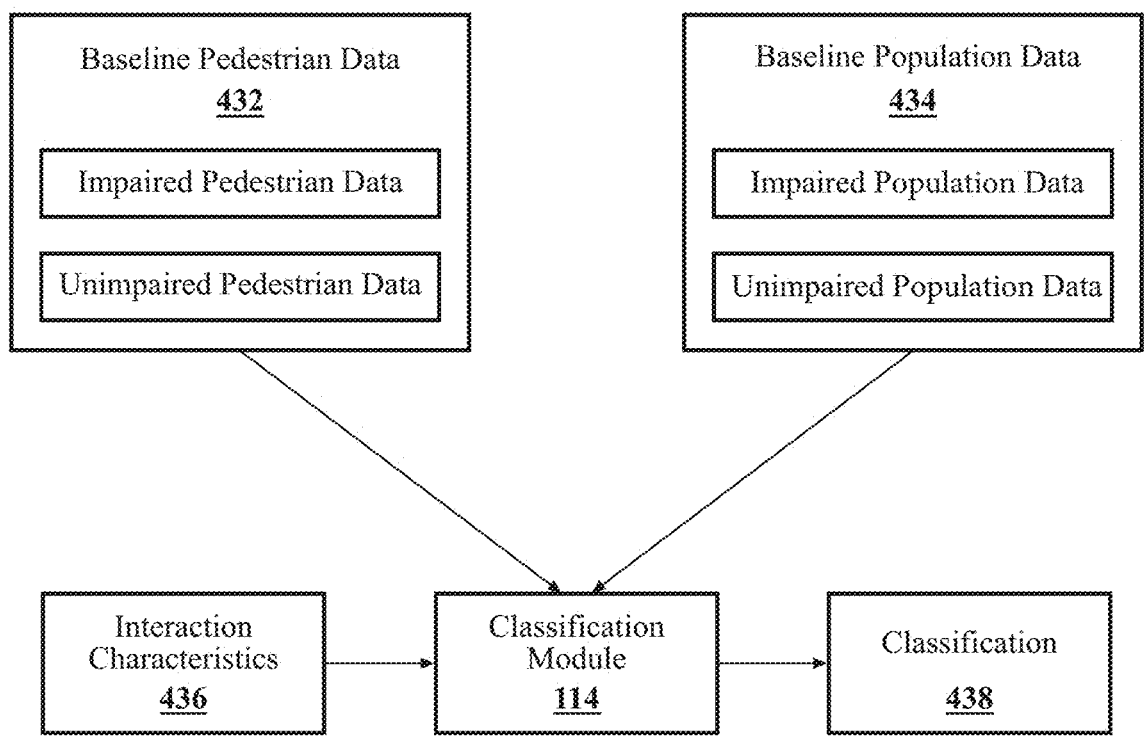
FIG. 4 illustrates one embodiment of a machine-learning pedestrian assistance system associated with assisting pedestrians exhibiting impaired decision-making.

FIG. 4 illustrates one embodiment of a machine-learning pedestrian assistance system 100 that is associated with assisting pedestrians 220 exhibiting impaired decision-making. Specifically, FIG. 4 depicts the classification module 114, which in one embodiment with the classification model 106, executes a machine learning algorithm to generate a classification 438 for the pedestrian 220, which classification 438 indicates a decision-making state for the pedestrian.

As described above, the machine-learning model may take various forms, including a machine-learning model that is supervised, unsupervised, or reinforcement-trained. In one particular example, the machine-learning model may be a neural network that includes any number of 1) input nodes that receive interaction data 104, 2) hidden nodes, which may be arranged in layers connected to input nodes and/or other hidden nodes and which include computational instructions for computing outputs, and 3) output nodes connected to the hidden nodes which generate an output indicative of the classification 438 for the pedestrian 220.

As described above, the classification module 114 relies on baseline interaction data to classify the pedestrian 220. Specifically, the classification module 114 may acquire baseline pedestrian data 432, stored as interaction data 104 in the data store 102, and baseline population data 434, which is also stored as interaction data 104 in the data store 102. As depicted in FIG. 4, the baseline interaction data may be characterized as whether it represents impaired or unimpaired data. That is, the pedestrian and other users may exhibit certain patterns when they are unimpaired and other patterns when impaired. The baseline interaction data may reflect both of these conditions, and the classification module 114, whether supervised, unsupervised, or reinforcement-trained, may detect similarities between the interaction characteristics of the pedestrian 220 with the patterns identified in the baseline pedestrian data 432 and/or the baseline population data 434.

As an example, a pedestrian 220 may be texting with a family member, and the messages therein may include various grammatical errors, and the pedestrian 220 may have repeatedly composed and deleted a message before sending it. By comparison, baseline pedestrian data 432 may indicate that the pedestrian 220 is usually grammatically proficient and does not repeatedly compose and delete messages before sending them. This baseline pedestrian data 432 indicating grammatical proficiency and messaging efficiency may indicate that the currently observed interaction characteristics 436 indicate impaired pedestrian decision-making. In other words, the classification module 114, along with the classification model 106, compares currently identified interaction characteristics 436 with what is typical or expected for that pedestrian and/or other users, based on historically collected data and relies on a machine-learning classification model 106 to generate a classification 438 based on the comparison of the historically determined pedestrian/population patterns and the currently measured interaction characteristics 436. Note that while a few examples of written communication characteristics (e.g., grammatical proficiency and repeated message composition) are relied on in classifying the pedestrian 220 as in a decision-impaired state, the classification module 114 may consider several different factors when classifying a pedestrian. That is, it may be that one characteristic by itself is not sufficient to correctly classify a pedestrian. As such, the classification module 114 relies on multiple data points from both the interaction characteristics 436 and baseline data to infer the state of the pedestrian.

Note that in some examples, the machine-learning model is weighted to rely more heavily on baseline pedestrian data 432 than baseline population data 434. That is, while certain interaction characteristics indicate impaired decision-making, some users interact in a way that deviates from the population behavior but does not constitute impaired decision-making. For example, the pedestrian 220 may routinely speak loudly and quickly with a particular spacing between words. Compared to the general population, this may be indicative of indecisiveness. However, given that it is the normal, or baseline, behavior for this particular pedestrian 220, interaction characteristics of loud and quick speaking with the certain spacing may not indicate impaired decision-making. As such, the classification module 114 may include instructions that cause the processor 108 to weigh the interaction patterns of the pedestrian more heavily than the interaction patterns of the additional individuals.

Moreover, it should be noted that the baseline pedestrian data 432 may change over time. For example, as a user becomes older, their hearing may deteriorate such that they habitually speak more loudly. As such, the classification module 114 may include instructions that cause the processor 108 to update the machine-learning instruction set to compare the interaction characteristic of the pedestrian 220 to the baseline interaction data based on continuously collected interaction data for the pedestrian 220. As such, the classification 438 is robust against changing interaction behaviors of the pedestrian 220.

As stated above, the classification module 114 considers different deviations and generates a classification 438. However, as each deviation from baseline interaction data may not conclusively indicate impaired decision-making, the classification module 114 considers and weights different deviations when generating the classification 438. For example, as described above, the classification module 114 may consider the quantity, frequency, and degree of deviation between the interaction characteristics 436 and the baseline interaction data when generating the classification 438.

In any example, if the deviation is greater by some threshold than the baseline interaction data, the classification module 114 outputs a classification 438, which classification 438 may be binary or graduated. For example, if the frequency, quantity, and degree of deviation surpass a threshold, the classification may indicate that the pedestrian 220 is in a decision-making impaired state. By comparison, if the frequency, quantity, and degree of deviation do not surpass the threshold, the classification module 114 may indicate that the pedestrian is not in the decision-making impaired state. In another example, the output may indicate a degree of impaired decision-making, which may be determined based on the frequency, quantity, and degree of deviation of the interaction characteristics from the baseline interaction data.

Figure 5:
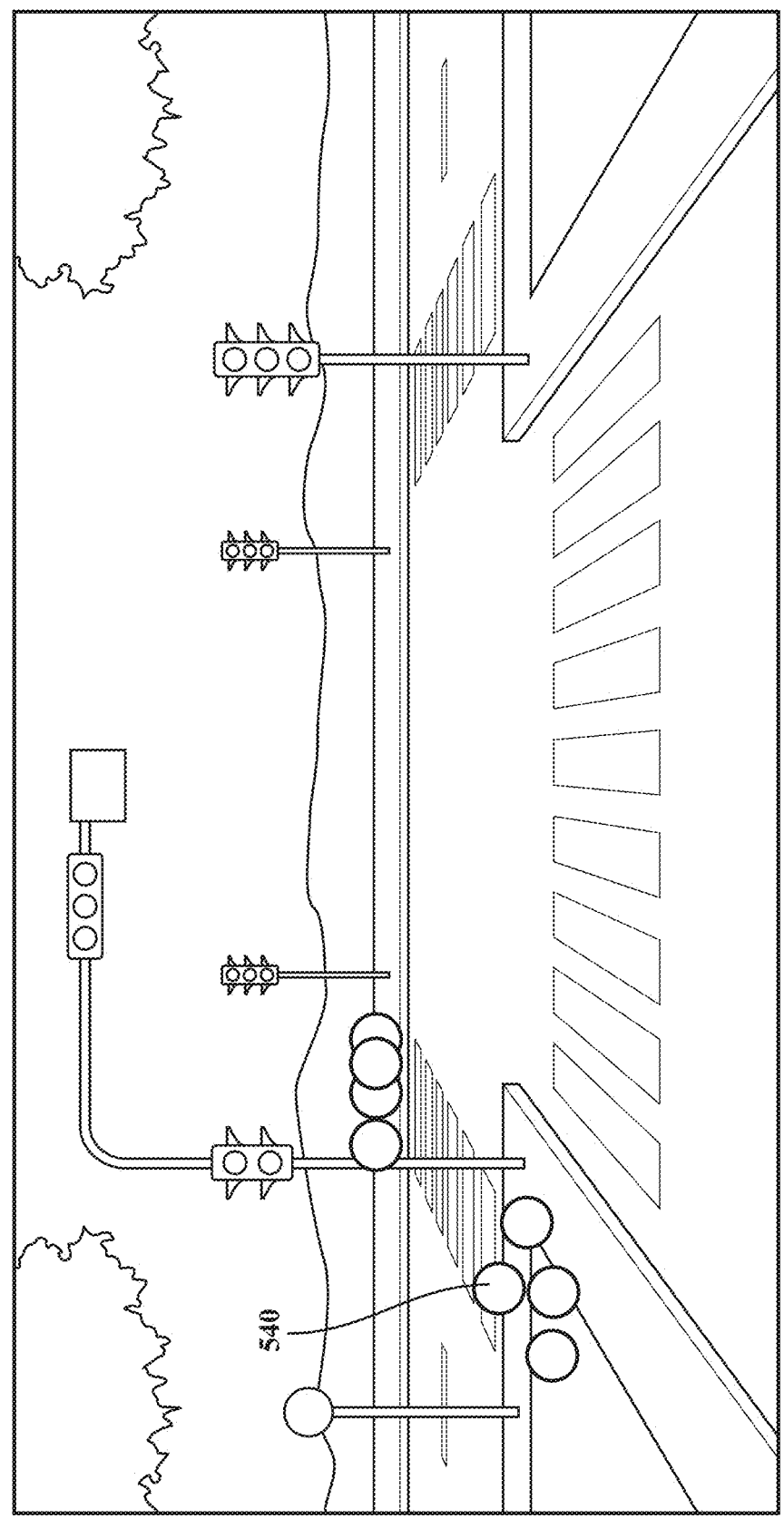
FIG. 5 illustrates one embodiment of a pedestrian assistance system identifying an overt feature of confusion.

FIG. 5 illustrates one embodiment of a pedestrian assistance system 100 identifying an overt feature of confusion.

In an example, an impaired decision-making of a pedestrian may be symptomatic of a larger problem. For example, interactions indicative of fatigue or stress may also indicate confusion. For example, slowed speech, a longer period between composing and sending a text message, and placing something in a shopping cart but not purchasing the item may indicate impaired decision-making or that the pedestrian 220 is confused. Accordingly, the pedestrian assistance system 100 may accumulate classifications 438 for multiple pedestrians to identify patterns therein. Based on a temporal or geographical relationship of the instances of identified impaired decision-making, the pedestrian assistance system 100 may identify a larger environmental concern. That is, as described above, each determined instance of impaired decision-making may be associated with metadata indicating the time and/or location of the pedestrian when the classification was made. The pedestrian assistance system 100 may group classification events based on their temporal or spatial relationship. For example, as depicted in FIG. 5, the data store 102 may record the location and time of instances 540 when a pedestrian was classified as experiencing impaired decision-making. For reference, a single instance 540 is identified with a reference number. Given that there are multiple instances 540 recorded at a given intersection, the pedestrian assistance system 100 may identify this intersection as one with a latent complication that gives rise to pedestrian confusion, for example, due to improper lane/crosswalk markings, etc.

Accordingly, the classification module 114 may include instructions that cause the processor 108 to identify an overt feature of confusion based on at least one of geographical or temporal similarity between interaction characteristics of multiple pedestrians classified as being in the impaired decision-making state. In this example, the countermeasure module 116 may include instructions that cause the processor to produce a report of the overt feature of confusion. Such a report may indicate the location of the point of confusion as well as other data, including a frequency of confusion and/or a time/date associated with the detected instances of confusion. In an example, the report is transmitted to a third party, such as an emergency response or infrastructure management company, to facilitate a remedial action to address the overt feature of confusion. The report may also be transmitted to other entities, such as vehicle drivers and pedestrians so that the vehicle drivers/pedestrians are made aware that a report has been submitted and that they do not need to report the overt feature of confusion otherwise. As such, the pedestrian assistance system 100 may, in this example, identify systemic points of confusion within an infrastructure based on detecting multiple instances of pedestrian impairment.

Figure 6:
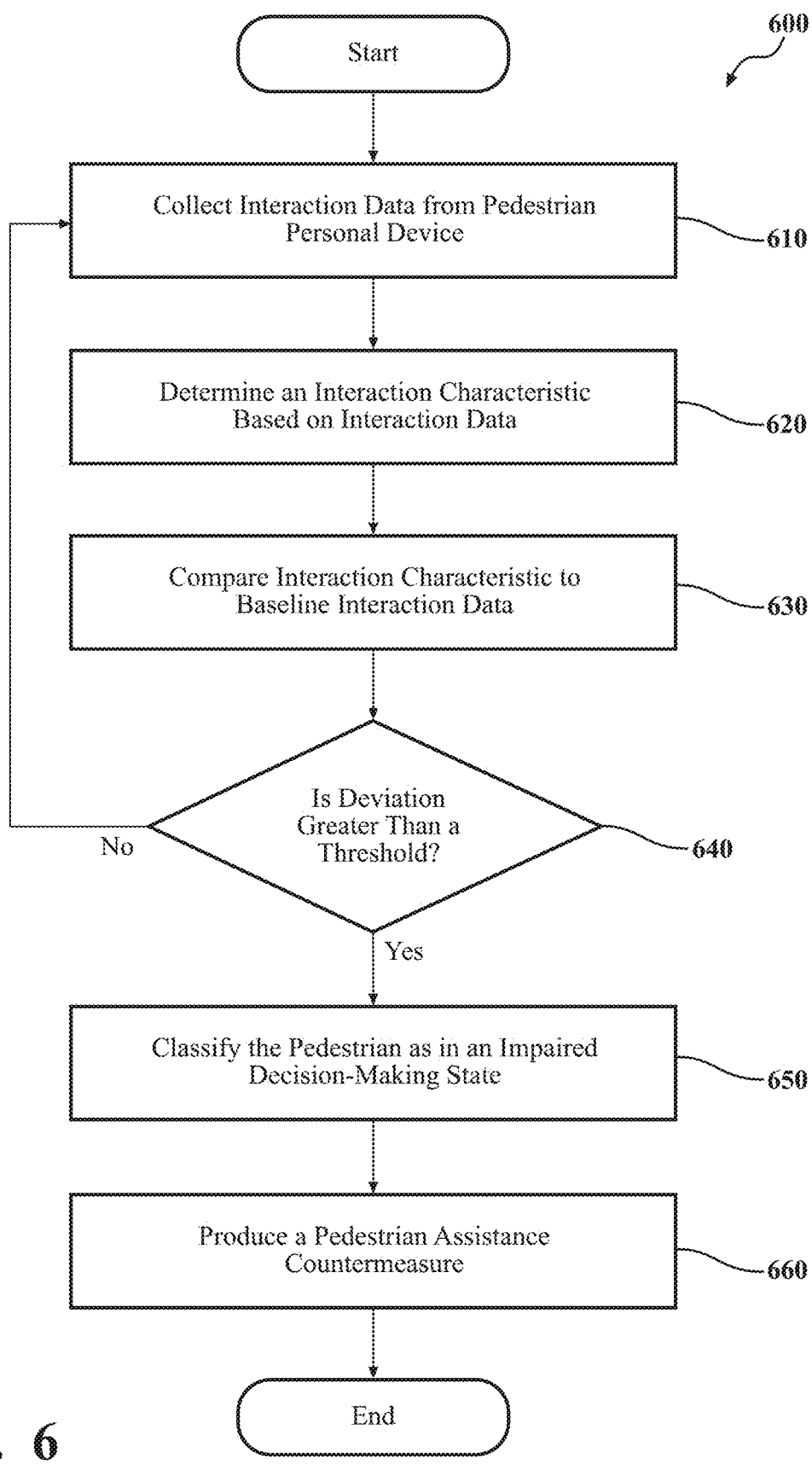
FIG. 6 illustrates a flowchart for one embodiment of a method associated with assisting pedestrians exhibiting impaired decision-making.

Additional aspects of alleviating impaired decision-making-based pedestrian risks will be discussed in relation to FIG. 6. FIG. 6 illustrates a flowchart of a method 600 that is associated with identifying and classifying a pedestrian's decision-making state. Method 600 will be discussed from the perspective of the pedestrian assistance system 100 of FIG. 1. While method 600 is discussed in combination with the pedestrian assistance system 100, it should be appreciated that the method 600 is not limited to being implemented within the pedestrian assistance system 100 but is instead one example of a system that may implement the method 600.

At 610, the interaction module 112 retrieves the interaction data 104. For example, the pedestrian assistance system 100 may communicate with multiple user devices 222 to establish baseline interaction data and determine current interaction characteristics for a pedestrian 220. In an example, the interaction module 112 acquires the interaction data 104 at successive iterations or time steps. Thus, the pedestrian assistance system 100, in one embodiment, iteratively executes the functions discussed at blocks 610-640 to acquire the interaction data 104 and provide information therefrom. Furthermore, the interaction module 112 and classification module 114, in one embodiment, execute one or more of the noted functions in parallel in order to maintain updated perceptions.

At 620, the interaction module 112 determines, from interaction data 104 and trait and context data 105 collected by a user device 222, an interaction characteristic 436 of the pedestrian 220. As described above, this may include written communication characteristics, verbal communication characteristics, or application interaction characteristics such as activity on a social media application.

At 630, the classification module 114 compares the interaction characteristic 436 to baseline interaction data. As described above, the baseline interaction data may include historical interaction patterns of the pedestrian and/or other users (e.g., general population and/or regional population) and may further be classified as indicative of impaired or unimpaired behavior of the pedestrian and/or other users. The baseline interaction data represents expected or anticipated behavior for the pedestrian based on their historical patterns and/or the historical patterns of additional users.

At 640, the classification module 114 determines whether any deviation(s) between the currently measured interaction characteristics 436 and the baseline interaction data is greater or less than a threshold. If not greater than a threshold, then the interaction module 112 continues to monitor pedestrian interactions. If the deviation(s) is greater than a threshold, then at 650, the classification module 114 classifies the pedestrian 220 as being in an impaired decision-making state.

At 660, the countermeasure module 116 produces a pedestrian assistance countermeasure responsive to a determined impaired decision-making state for the pedestrian 220. As described above, such countermeasures may take a variety of forms and may include a simple notification or a command signal transmitted to entities (e.g., vehicles, drivers, and infrastructure elements) in the vicinity of the decision-making impaired pedestrian to take remedial actions to reduce the danger resulting from the impaired decision-making state of the pedestrian 220. As such, the present system, methods, and other embodiments promote the safety of all road users by identifying pedestrians 220 who are decision-impaired based on their interactions with others in written or verbal form and with applications on a user device 222.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. The systems, components and/or processes also can be embedded in a computer-readable storage, such as a computer program product or other data program storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. A non-exhaustive list of the computer-readable storage medium can include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or a combination of the foregoing. In the context of this document, a computer-readable storage medium is, for example, a tangible medium that stores a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
a processor; and
a memory storing machine-readable instructions that, when executed by the processor, cause the processor to:
   determine, from interaction data collected by a user device of a pedestrian, an interaction characteristic of the pedestrian;
   classify the pedestrian as in an impaired decision-making state based on the interaction characteristic of the pedestrian deviating from baseline interaction data; and
   produce a pedestrian assistance countermeasure responsive to a determined impaired decision-making state for the pedestrian.

2. The system of claim 1, wherein:
the machine-readable instruction that, when executed by the processor, causes the processor to determine the interaction characteristic of the pedestrian comprises a machine-readable instruction that, when executed by the processor, causes the processor to determine at least one of a verbal communication characteristic or a written communication characteristic of the pedestrian; and
the machine-readable instruction that, when executed by the processor, causes the processor to classify the pedestrian as in the impaired decision-making state comprises a machine-readable instruction that, when executed by the processor, causes the processor to identify that the pedestrian is having difficulty composing at least one of a verbal communication or a written communication.

3. The system of claim 2, wherein the machine-readable instruction that, when executed by the processor, causes the processor to classify the pedestrian as in the impaired decision-making state comprises a machine-readable instruction that, when executed by the processor causes the processor to classify the pedestrian as in the impaired decision-making state further based on a context of the verbal communication or the written communication.

4. The system of claim 1, wherein the machine-readable instruction that, when executed by the processor, causes the processor to determine the interaction characteristic of the pedestrian comprises a machine-readable instruction that, when executed by the processor, causes the processor to determine a characteristic of an interaction of the pedestrian with an application of the user device.

5. The system of claim 1, wherein:
the machine-readable instruction that, when executed by the processor, causes the processor to classify the pedestrian as in the impaired decision-making state comprises a machine-learning instruction that, when executed by the processor, causes the processor to compare the interaction characteristic of the pedestrian to the baseline interaction data; and
the baseline interaction data comprises at least one of:
an interaction pattern of the pedestrian; or
an interaction pattern of an additional individual.

6. The system of claim 5, wherein the machine-learning instruction that, when executed by the processor, causes the processor to compare the interaction characteristic of the pedestrian to the baseline interaction data comprises a machine-learning instruction that, when executed by the processor, causes the processor to:
weight the interaction pattern of the pedestrian more heavily than the interaction pattern of the additional individual; and
update a machine-learning instruction set to compare the interaction characteristic of the pedestrian to the baseline interaction data based on continuously collected interaction data for the pedestrian.

7. The system of claim 1, wherein the machine-readable instruction that, when executed by the processor, causes the processor to classify the pedestrian as in the impaired decision-making state comprises a machine-readable instruction that, when executed by the processor, causes the processor to classify the pedestrian as in the impaired decision-making state based on at least one of:
a degree of deviation between the interaction characteristic and the baseline interaction data; or
a quantity of deviations between interaction characteristics and the baseline interaction data within a period of time.

8. The system of claim 1, wherein the machine-readable instruction that, when executed by the processor, causes the processor to produce the pedestrian assistance countermeasure comprises a machine-readable instruction that, when executed by the processor, causes the processor to produce a notification to at least one of:
a human vehicle operator;
an autonomous vehicle system; or
an infrastructure element.

9. The system of claim 8, wherein the machine-readable instruction that, when executed by the processor, causes the processor to produce the pedestrian assistance countermeasure comprises a machine-readable instruction that, when executed by the processor, causes the processor to produce a command signal for at least one of:
a vehicle; or
the infrastructure element.

10. The system of claim 1, wherein:
the machine-readable instructions further comprise a machine-readable instruction that, when executed by the processor, causes the processor to identify an overt feature of confusion based on at least one of a geographical or temporal similarity between pedestrians classified as in the impaired decision-making state; and
the machine-readable instruction that, when executed by the processor, causes the processor to produce the pedestrian assistance countermeasure comprises a machine-readable instruction that, when executed by the processor, causes the processor to produce a report of the overt feature of confusion.

11. The system of claim 1, wherein the machine-readable instruction that, when executed by the processor, causes the processor to classify the pedestrian as in the impaired decision-making state comprises a machine-readable instruction that, when executed by the processor, causes the processor to classify the pedestrian as in the impaired decision-making state based on at least one of a physical movement of the pedestrian or a physical trait of the pedestrian.

12. The system of claim 1, wherein the machine-readable instruction that, when executed by the processor, causes the processor to classify the pedestrian as in the impaired decision-making state comprises a machine-readable instruction that, when executed by the processor, causes the processor to classify the pedestrian as in the impaired decision-making state based on context data associated with the pedestrian.

13. A non-transitory machine-readable medium comprising instructions that, when executed by a processor, cause the processor to:
determine, from interaction data collected by a user device of a pedestrian, an interaction characteristic of the pedestrian;
classify the pedestrian as in an impaired decision-making state based on the interaction characteristic of the pedestrian deviating from baseline interaction data; and
produce a pedestrian assistance countermeasure responsive to a determined impaired decision-making state for the pedestrian.

14. The non-transitory machine-readable medium of claim 13, wherein:
the instruction that, when executed by the processor, causes the processor to classify the pedestrian as in the impaired decision-making state comprises an instruction that, when executed by the processor, causes the processor to compare the interaction characteristic of the pedestrian to the baseline interaction data; and
the baseline interaction data comprises at least one of:
an interaction pattern of the pedestrian; or
an interaction pattern of an additional individual.

15. The non-transitory machine-readable medium of claim 13, wherein the instruction that, when executed by the processor, causes the processor to produce the pedestrian assistance countermeasure comprises an instruction that, when executed by the processor, causes the processor to produce a command signal to at least one of a vehicle or an infrastructure element in a vicinity of the pedestrian.

16. A method, comprising:
determining, from interaction data collected by a user device of a pedestrian, an interaction characteristic of the pedestrian;
classifying the pedestrian as in an impaired decision-making state based on the interaction characteristic of the pedestrian deviating from baseline interaction data; and
producing a pedestrian assistance countermeasure responsive to a determined impaired decision-making state for the pedestrian.

17. The method of claim 16, wherein:
determining the interaction characteristic of the pedestrian comprises determining, for the pedestrian at least one of a verbal communication characteristic, a written communication characteristic, or an application interaction characteristic; and
classifying the pedestrian as in the impaired decision-making state comprises identifying that the pedestrian is having difficulty composing a communication or interacting with an application.

18. The method of claim 16, wherein:
classifying the pedestrian as in the impaired decision-making state comprises comparing the interaction characteristic of the pedestrian to the baseline interaction data; and
the baseline interaction data comprises at least one of:
an interaction pattern of the pedestrian; or
an interaction pattern of an additional individual.

19. The method of claim 16, wherein producing the pedestrian assistance countermeasure comprises producing a notification to at least one of:
a human vehicle operator;
an autonomous vehicle system; or
an infrastructure element.

20. The method of claim 16:
further comprising identifying an overt feature of confusion based on at least one of a geographical or temporal similarity between multiple pedestrians classified as in the impaired decision-making state; and
wherein producing the pedestrian assistance countermeasure comprises producing a report of the overt feature of confusion.

* * * * *